(12) United States Patent
Pertschi

(10) Patent No.: US 11,383,931 B2
(45) Date of Patent: Jul. 12, 2022

(54) APPARATUS FOR LIFTING AND POSITIONING A REMOTE-CONTROLLED AIRCRAFT

(71) Applicant: John Pertschi, Mebane, NC (US)

(72) Inventor: John Pertschi, Mebane, NC (US)

(*) Notice: Subject to any disclaimer, the term of this patent is extended or adjusted under 35 U.S.C. 154(b) by 389 days.

(21) Appl. No.: 16/801,235

(22) Filed: Feb. 26, 2020

(65) Prior Publication Data
US 2020/0283231 A1 Sep. 10, 2020

Related U.S. Application Data

(60) Provisional application No. 62/813,365, filed on Mar. 4, 2019.

(51) Int. Cl.
*B65G 9/00* (2006.01)
*B64C 39/02* (2006.01)

(52) U.S. Cl.
CPC .............. *B65G 9/00* (2013.01); *B64C 39/024* (2013.01); *B64C 2201/201* (2013.01); *B65G 2201/0294* (2013.01)

(58) Field of Classification Search
CPC .... B65G 9/00; B65G 2201/0294; B65G 7/12; B64C 39/024; B64C 2201/201; B64F 1/224
See application file for complete search history.

(56) References Cited

U.S. PATENT DOCUMENTS

| | | | |
|---|---|---|---|
| 10,249,200 B1* | 4/2019 | Grenier | G08G 5/025 |
| 10,913,534 B1* | 2/2021 | Brum | B64C 39/024 |
| 2006/0249623 A1* | 11/2006 | Steele | B64F 1/04 |
| | | | 244/116 |
| 2016/0016675 A1* | 1/2016 | Zwaan | B64C 39/024 |
| | | | 244/110 C |
| 2016/0083115 A1* | 3/2016 | Hess | B64C 39/022 |
| | | | 701/3 |
| 2019/0047696 A1* | 2/2019 | Gwin | B64D 1/22 |
| 2019/0047698 A1* | 2/2019 | Jassowski | B64C 39/024 |
| 2019/0070995 A1* | 3/2019 | Cantrell | B64F 1/222 |
| 2019/0202560 A1* | 7/2019 | Bosworth | B25J 15/0213 |
| 2019/0308724 A1* | 10/2019 | Cooper | B64C 39/024 |
| 2019/0321971 A1* | 10/2019 | Bosworth | B25J 9/1065 |
| 2020/0023966 A1* | 1/2020 | Stephens | G05D 1/101 |
| 2021/0171214 A1* | 6/2021 | Schonfelder | B64F 1/22 |
| 2021/0300557 A1* | 9/2021 | Oshima | G05D 1/0866 |
| 2021/0323654 A1* | 10/2021 | Gildas | E05D 3/14 |

* cited by examiner

*Primary Examiner* — Mussa A Shaawat

(74) *Attorney, Agent, or Firm* — Dogwood Patent and Trademark Law; Ashley D. Johnson

(57) ABSTRACT

The presently disclosed subject matter is directed to a device that can be used to lift and/or position a remote-controlled (RC) aircraft as needed by a user (e.g., into/out of a transport vehicle). The device includes a handle that allows the user to grip and hold the device. The handle is operably connected to an arm that comprises an angled portion and a connector portion. The angled portion is angled to accommodate the canopy of an associated aircraft. The connector portion allows joining of the arm to an extender. The extender passes through the central portion of the aircraft to allow the user to lift and/or position the aircraft as desired.

20 Claims, 16 Drawing Sheets

APPARATUS FOR LIFTING AND POSITIONING A REMOTE-CONTROLLED AIRCRAFT

CROSS-REFERENCE TO RELATED APPLICATIONS

The subject application claims priority to U.S. Provisional Patent Application No. 62/813,365, filed Mar. 4, 2019, the entire content of which is hereby incorporated by reference.

TECHNICAL FIELD

The presently disclosed subject matter relates to an apparatus for use with a remote-controlled aircraft. Particularly, the disclosed assembly allows a user to easily lift and position the aircraft on demand.

BACKGROUND

The sport of flying radio-controlled aircraft has increased in popularity over the past several years. Many hobbyists spend a considerable amount of time building and flying such radio-controlled aircraft. As is known, the aircraft are flown by a pilot that sends control signals from a transmitter to a receiver in the aircraft. Because they must be lightweight to stay in flight and perform maneuvers effectively, the aircraft are inherently fragile and must be handled with care, especially during transport and positioning (e.g., lifting into and out of a vehicle). Prior art methods of transporting and positioning remote-controlled aircraft include the use of materials that wrap around the body of the aircraft. However, these materials are bulky and require a time investment to properly position the airplane within the wrap materials. Alternate prior art designs include stands that support the weight of the aircraft. However, prior art stands are cumbersome and large, often requiring two people to lift the assembly into or out of a transport vehicle. It would therefore be beneficial to provide a device that overcomes the shortcomings of the prior art and allows for the safe and effective lifting and handling of a remote-controlled aircraft.

SUMMARY

In some embodiments, the presently disclosed subject matter is directed a device comprising a handle comprising a first end and a second end. The device includes an arm comprising an angled portion joined to a connecting portion, wherein the angled and connecting portions are each defined by a first end, second end, and main body therebetween, wherein the first end of the angled portion is coupled to the first or second end of the handle at an angle of about 95-175 degrees, and the second end of the angled portion is operably attached to the first end of the connecting portion at an angle of about 95-175 degrees. The device includes an extender with a first end that is joined to the second end of the connecting portion at an angle of about 45-135 degrees.

In some embodiments, the handle includes a gripping area configured around at least a portion of the handle.

In some embodiments, one or both of the angled portion or connector portion has an L-shaped, oval, or circular cross-sectional shape.

In some embodiments, the handle and the extender are configured to be about parallel relative to each other.

In some embodiments, the extender and the connecting portion are configured to be about perpendicular to each other.

In some embodiments, the extender includes a covering that extends around at least a portion of an external surface of the extender. In some embodiments, the covering comprises silicon, rubber, polymeric material, foam, fabric, or combinations thereof.

In some embodiments, the presently disclosed subject matter is directed to a device comprising a handle comprising a first end and a second end; an arm comprising an angled portion joined to a connecting portion, wherein the angled and connecting portions are each defined by a first end, second end, and main body therebetween; a neck comprising a first end and a second end, wherein the first end is operably connected to the first end of the handle and the second end of the neck is joined to the first end of the angled portion; and an extender with a first end that is joined to the second end of the connecting portion at an angle of about 45-135 degrees. The second end of the angled portion is operably attached to the first end of the connecting portion at an angle of about 95-175 degrees.

In some embodiments, the presently disclosed subject matter is directed to a method of lifting and relocating an aircraft with a body comprising at least one opening therethrough. The method includes grasping the handle of the disclosed device, inserting the second end of the extender into the aircraft body opening, such that the extender spans at least a portion of an interior of the aircraft opening. The method includes lifting the device by grasping the handle and lifting to thereby lift the body of the aircraft to a desired location.

BRIEF DESCRIPTION OF THE DRAWINGS

The previous summary and the following detailed descriptions are to be read in view of the drawings, which illustrate some (but not all) embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments+/−0.1%, from the specified amount, as such variations are appropriate in the disclosed packages and methods.

Figure 1:
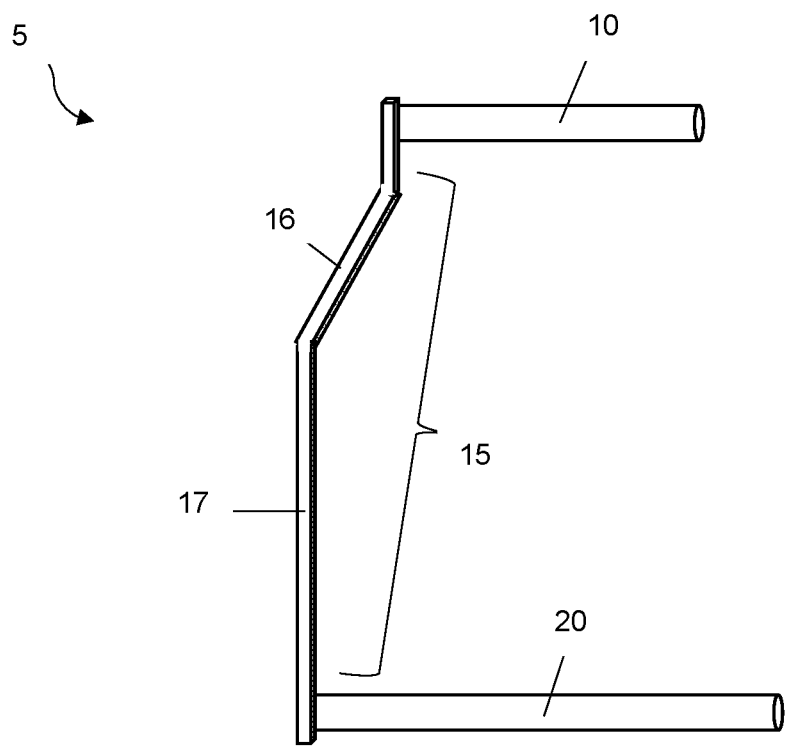
FIG. 1 is a front plan view of a device that can be used to lift and/or position a remote-controlled (RC) aircraft in accordance with some embodiments of the presently disclosed subject matter.

FIG. 1 illustrates one embodiment of device 5 that can be used to lift and/or position a remote-controlled (RC) aircraft as needed by a user (e.g., into/out of a transport vehicle). As shown, the device includes handle 10 that allows the user to grip and hold the device. The handle is operably connected to arm 15 that comprises angled portion 16 and connector portion 17. The angled portion is angled to accommodate the canopy of an associated aircraft. Connector portion 17 allows joining of the arm to extender 20. The extender passes through the central portion (width) of the aircraft body to allow the user to lift and/or position the aircraft as desired. The term "aircraft" as used herein refers to any flying machine that can be lifted using the disclosed device, such as (but not limited to) airplanes, gliders, helicopters, drones, and the like. The term "airplane canopy" refers to the angled (e.g., hull) portion of an aircraft.

Figure 2A:
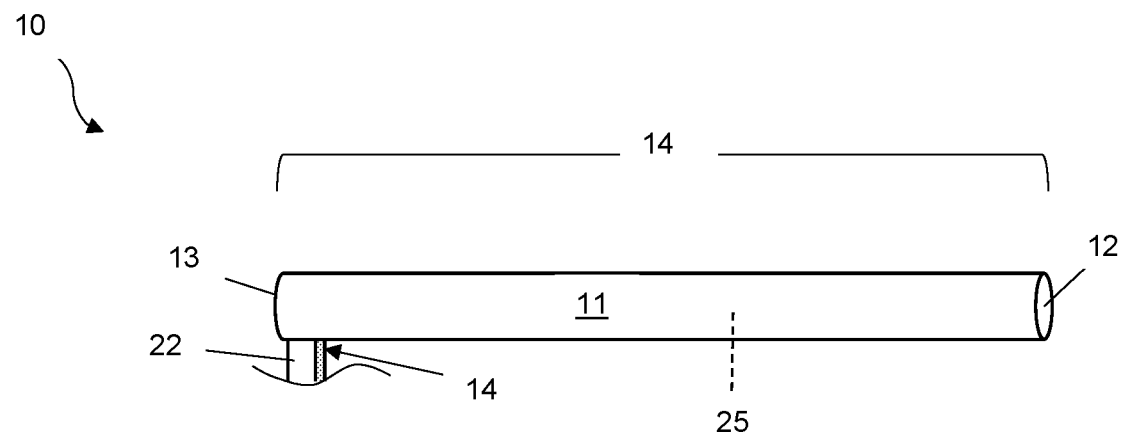
FIG. 2a is a perspective view of a device handle in accordance with some embodiments of the presently disclosed subject matter.

FIG. 2a depicts one embodiment of handle 10 of device 5. As shown, the handle is sized and shaped to allow a user's hand to grasp around handle body 11 to lift the device. In some embodiments, the handle can be tubular in structure, having a hollow interior 25. Alternatively, body 11 can be configured as a solid structure to add heft and weight to the handle. Handle 10 can have any desired cross-sectional shape, such as round, oval, square, rectangular, triangular, hexagonal, octagonal, abstract, and the like.

Handle 10 can be configured with any desired length 14. The term "length" as used herein refers to the longest dimension in the longitudinal direction (e.g., from first end 12 to second end 13 in FIG. 2a). In some embodiments, handle 10 can have a length of about 3-15 inches. Thus, the handle can be configured with length 14 of at least about (or no more than about) 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 inches. However, the presently disclosed subject matter is not limited, and handle 10 can have a length greater or smaller than the range set forth above.

Figure 2B:
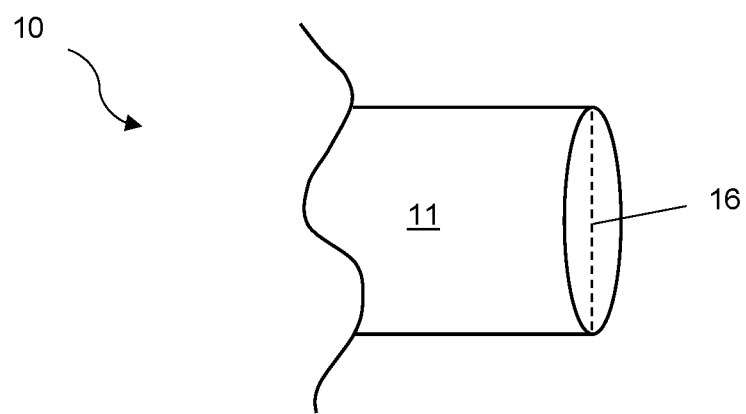
FIG. 2b is a fragmentary view of a device handle in accordance with some embodiments of the presently disclosed subject matter.

The handle can have any desired diameter 16. The term "diameter" refers to the longest distance of a straight-line segment passing through the center of an object, segment, or face, as shown in FIG. 2b. For example, in some embodiments, the handle can have a diameter of about 0.25-5 inches. Thus, the handle can have a diameter of at least about (or no more than about) 0.25, 0.3, 0.4, 0.5, 0.6, 0.7, 0.8, 0.9, 1, 1.5, 2, 2.5, 3, 3.5, 4, 4.5, or 5 inches. However, it should be appreciated that handle 10 can have a diameter larger or smaller than the range set forth above. In some embodiments, the diameter of handle 10 is consistent about the length of the base. However, the presently disclosed subject matter also includes embodiments wherein the diameter of the base tapers or varies.

Figure 2C:
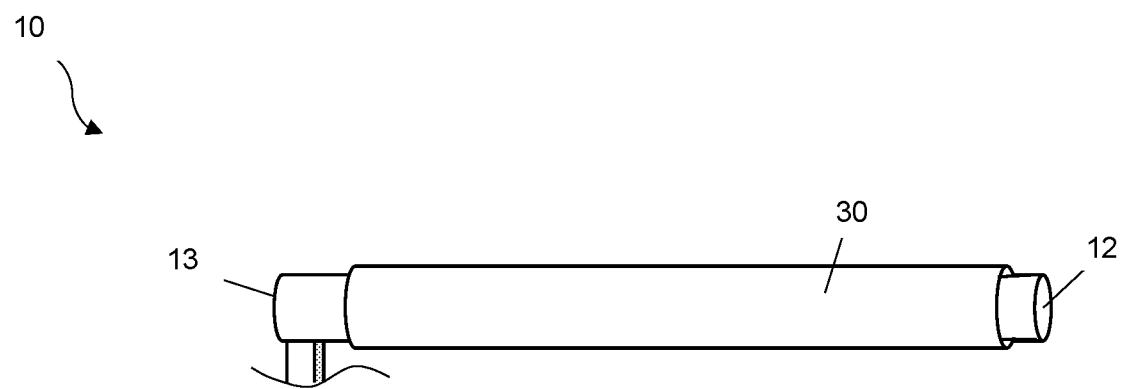
FIG. 2c is a perspective view of the device handle of FIG. 2a comprising a grip in accordance with some embodiments of the presently disclosed subject matter.

As shown in FIG. 2c, in some embodiments, handle 10 includes grip 30 configured as a sleeve that fits around and/or across at least a portion of the handle. The grip provides a secure and comfortable grasp for the user's hand during use. Grip 30 can include any material that allows the user to effectively grasp and/or maintain control of the handle, such as (but not limited to) rubber, polymeric material, foam, silicone, fabric, leather, or combinations thereof. In some embodiments, the grip can include one or more elements that allow the user to securely grasp grip 30, such as one or more textured regions, indentations, finger grips, and the like. However, it should be appreciated that the disclosed feature is optional and handle 10 can be configured without grip 30.

Alternatively, in some embodiments, handle body 11 can include one or more gripping features to allow the user to effectively grip the handle. For example, the handle main body can include at least one textured region, finger indentations, raised portions, and the like.

Figure 2D:
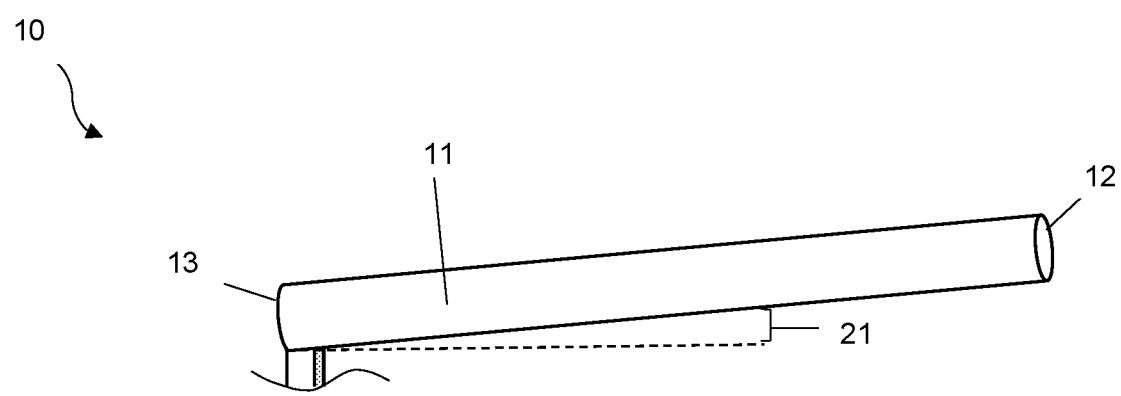
FIGS. 2d-2e are perspective views of a device handle in accordance with some embodiments of the presently disclosed subject matter.
Figure 2E:
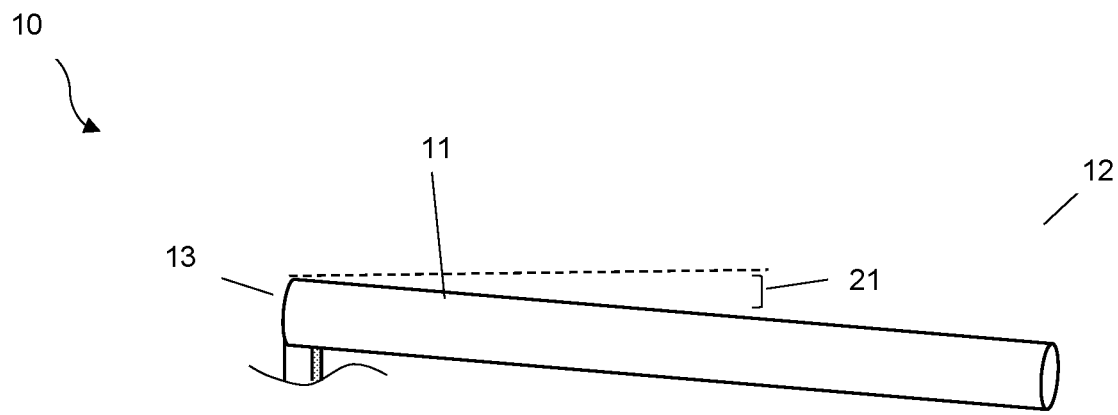

In some embodiments, the handle is constructed to be in an approximately horizontal configuration when in use, as shown in the figures. The term "horizontal" refers to a position that is about parallel with the ground upon which the associated RC aircraft lies. However, the presently disclosed subject matter also includes embodiments where the handle is angled, as desired by the user. For example, the handle can be configured at angle 21 of about 1-45 degrees (e.g., 1, 5, 10, 15, 20, 25, 30, 35, 40, or 45 degrees) above or below horizontal, as illustrated in FIGS. 2d and 2e. However, the presently disclosed subject matter is not limited and angle 21 can be acute or obtuse as desired by the user.

Figure 2F:
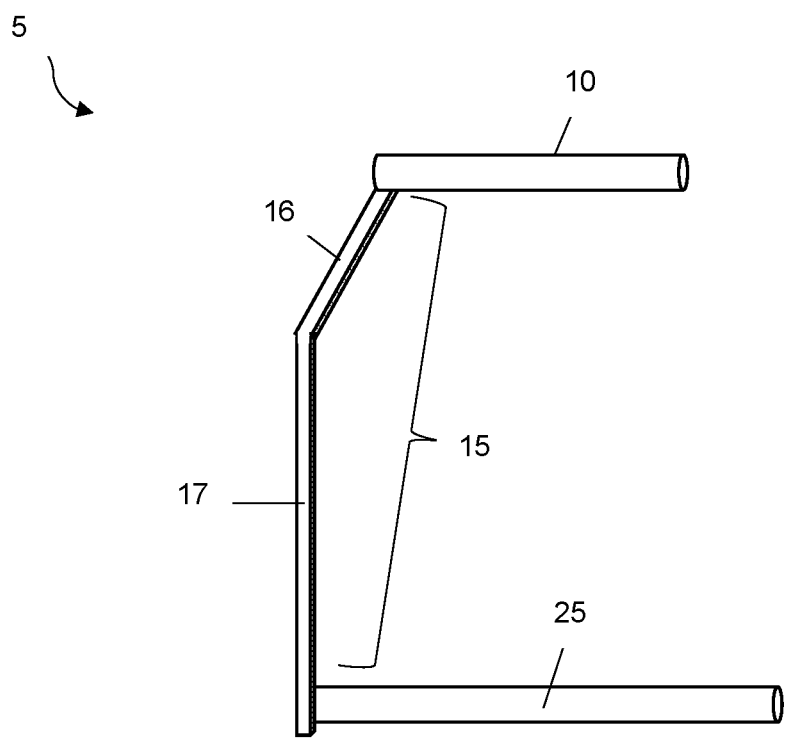
FIG. 2f is a front plan view of a lifting device in accordance with some embodiments of the presently disclosed subject matter.

As described above, handle 10 is operably connected to arm 15. As illustrated in FIG. 2a, device 5 can include neck 22 that acts to provide a secure and/or stable connection between the handle and the angled portion of the arm. Particularly, one end of the handle can be joined to a first end of the neck using any known mechanism, such as welding, adhesives, mechanical closures (e.g., nuts, screws, bolts, clips), and the like. The second end of the neck attaches to angled portion 16 of the arm using any known mechanism. However, neck 12 is optional, and the handle can directly attach to the arm in some embodiments, as shown in FIG. 2f. The neck can be connected to end 13 of the handle at any desired angle 14 (e.g., no more/less than about 45, 50, 55, 60, 65, 70, 75, 80, 85, 90, 95, 100, 105, 110, 115, 120, 125, 130, 135, 140, 145, 150, 160, or 165 degrees)

Figure 3A:
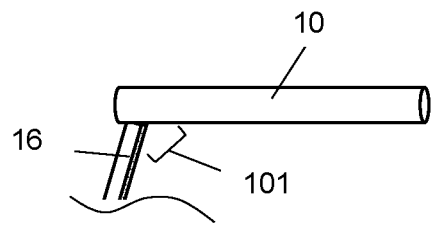
FIG. 3a is a front plan view illustrating a device angled portion in accordance with some embodiments of the presently disclosed subject matter.

Angled portion 16 can include any desired angle relative to the horizontal to allow the arm to accommodate the curvature of the aircraft canopy. For example, the angled portion can be obtuse relative to handle 10, as illustrated in FIG. 3a. The angled portion can therefore have angle 101 of at least about (or no more than about) 95, 100, 105, 110, 115, 120, 125, 130, 135, 140, 145, 150, 165, 170, or 175 degrees (relative to the handle). The angled portion of arm 15 allows the handle to be positioned above and around the aircraft main body when in use. The user can therefore lift the aircraft to move and/or position it, as described in more detail below.

Figure 3B:
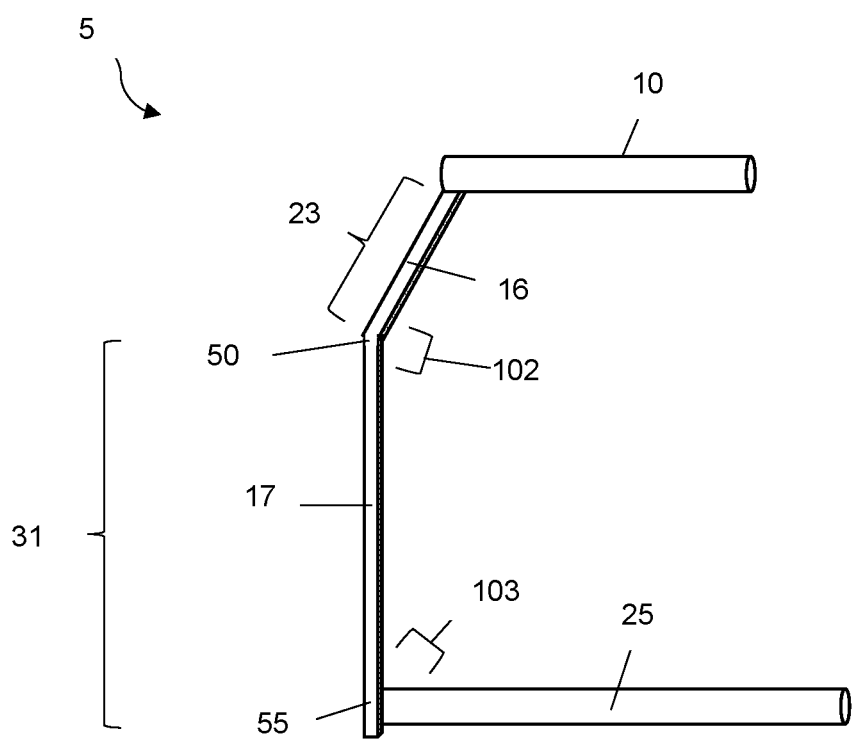
FIGS. 3b-3d are front plan views illustrating a lifting device in accordance with some embodiments of the presently disclosed subject matter.

Angled portion 16 is at the proper angle to accommodate the aircraft canopy (e.g., so that there is no contact between the aircraft canopy and arm 15). Further, the angled portion is sized to run at least a portion of the approximate length of the aircraft canopy. As shown in FIG. 3b, angled portion 15 can have a length 23 of about 3-20 inches, depending on the make and model of the aircraft. Thus, the angled portion can have a length of about 3, 4, 5, 6, 7, 8, 9, 10, 11, 12, 13, 14, 15, 16, 17, 18, 19, or 20 inches. It should be appreciated that the length can be greater or smaller than the range set forth above. In some embodiments, the angled portion and connector portion 17 can be of about the same length. However, the presently disclosed subject matter also includes embodiments wherein the angled portion is about 5, 10, 20, 30, 40, 50, 60, 70, 80, 90, or 100 percent (or more) larger or smaller than the connector portion.

As illustrated in FIG. 3b, the arm comprises connector portion 17 with first end 50 that attaches to the angled portion at angle 102. In some embodiments, angle 102 can comprise about 90-175 degrees (e.g., at least/no more than about 90, 95, 100, 105, 110, 115, 120, 125, 130, 135, 140, 145, 150, 155, 160, 165, or 170 degrees). The connector portion further includes second end 55 that joins to extender 25 at angle 103. Angle 103 can be about 45-160 degrees (e.g., at least/no more than about 45, 50, 55, 60, 65, 70, 75, 80, 85, 90, 95, 100, 105, 110, 115, 120, 125, 130, 135, 140, 145, 150, 155, or 160 degrees).

The connector portion can have any desired length, dependent upon the make and/or model of the particular aircraft it is to be used with. For example, in some embodiments, the connector portion can have a length 31 of at least/no more than about 5-30 inches (e.g., 5, 6, 7, 8, 9, 10, 11, 12, 13, 14, 15, 16, 17, 18, 19, 20, 21, 22, 23, 24, 25, 26, 27, 28, 29, or 30 inches). As set forth above, the connector and angled portions can be configured to be about the same size or with differing sizes.

Figure 3C:
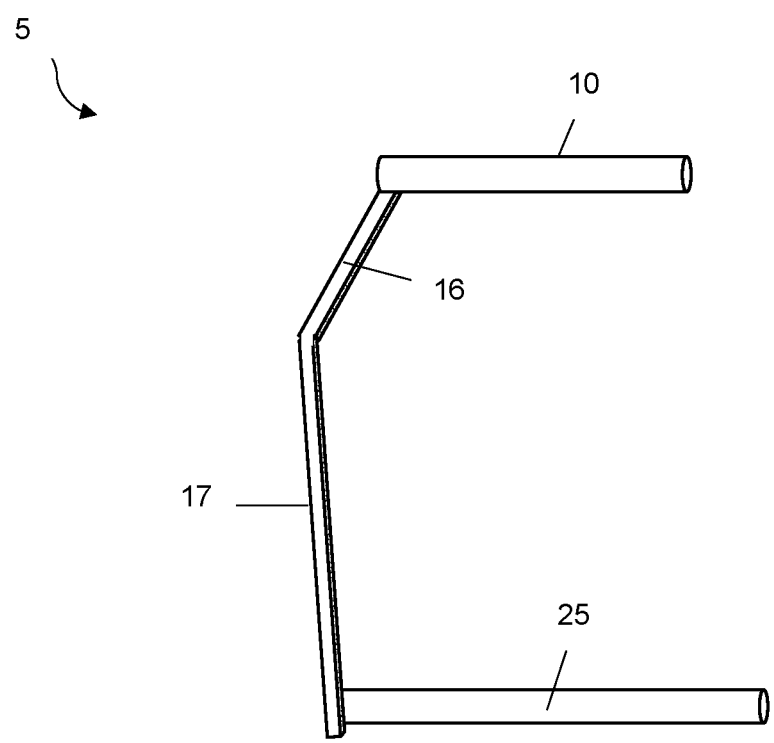
Figure 3D:
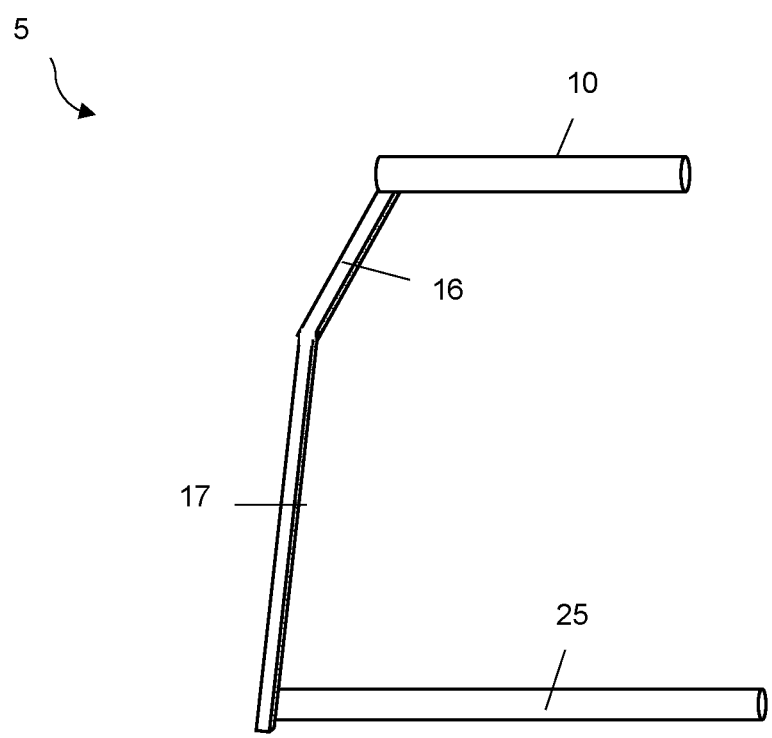

In some embodiments, connector portion can be configured in a substantially vertical orientation when handle 10 is held in the user's hand (e.g., during use). Thus, the connector portion can be at about a 90-degree angle, relative to extender 25 and/or handle 10. Alternatively, the connector portion can have an acute or obtuse angle, relative to handle 10, as shown in FIGS. 3c and 3d.

Angled portion 16 and connector portion 17 can have any desired cross-sectional shape, such as (but not limited to) round, oval, rectangular, square, triangular, hexagon, octagonal, abstract, and the like. In some embodiments, both portions of the arm have the same cross-sectional shape. However, the presently disclosed subject matter also includes embodiments wherein the cross-sectional shapes of the angled and connector portions differ. For example, the angled portion of the arm can be configured with a circular cross-sectional shape, and the connecting portion of the arm can be configured with a rectangular and/or flat shape. Similarly, one or both portions of arm 15 can be hollow or solid, depending on the user's preference.

Arm 15 can have any desired diameter, such as about 0.25-10 inches (e.g., at least/no more than about 0.25, 0.5, 1, 2, 3, 4, 5, 6, 7, 8, 9, or 10 inches). It should be appreciated that the angled portion of the arm can have the same or similar thickness compared to the connector portion. Alternatively, the thicknesses of the two arm portions can differ.

In some embodiments, angled and connector portions 16, 17 of arm 15 are constructed as two separate pieces that are joined together using methods wells known in the art. For example, the two portions can be joined through the use of welding, adhesives, and/or mechanical closures. However, in some embodiments, the angled portion and the connector portion can be constructed from a single piece of material.

Figure 4:
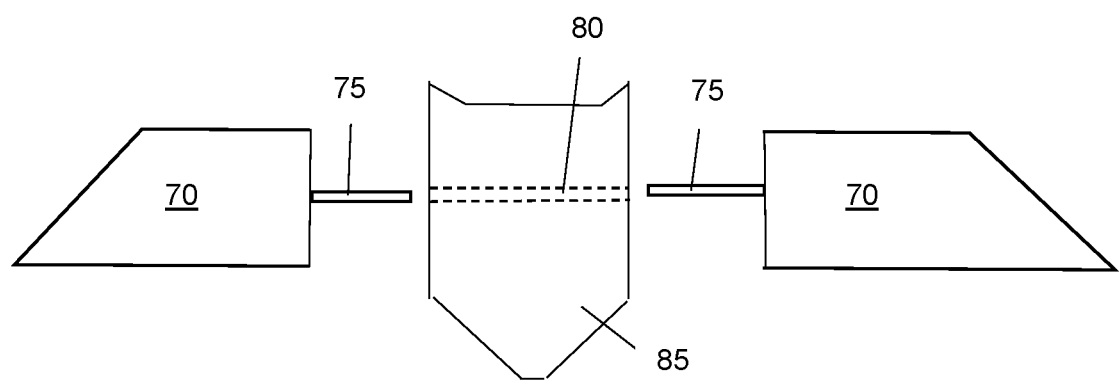
FIG. 4 is a top plan view of an RC aircraft comprising wings, wing pins, and wing openings in accordance with some embodiments of the presently disclosed subject matter.

As described above, extender 25 is joined to connector portion 17 of arm 15 and is configured to pass through at least a portion of the body of the associated aircraft. Particularly, the aircraft wings can be detached from the body of the aircraft during transport and/or positioning. In this way, the wings can be protected from damage. As shown in FIG. 4, each wing 70 typically includes alignment pin 75 that cooperates with one or more pin openings 80 on either side of aircraft body 85. Specifically, the wing pins can be inserted into corresponding pin openings 80 to attach an aircraft wing to the fuselage. The wing pin (and associated wing) can be detached from aircraft body 85 (such as during storage or transport) by removal from the pin opening. Wing pin 75 and pin opening 80 can cooperate using any known mechanism, such as (but not limited to) a snap-fit arrangement, locking arrangement, mechanical elements, and the like.

Extender 25 of device 5 is sized and shaped to pass through aircraft pin opening 80 to the interior of aircraft body 85. In some embodiments, the pin opening passes all the way through the fuselage to join with the pin opening configured on the opposite side of the aircraft, as shown in FIG. 4. In some embodiments, each pin opening passes partially through the aircraft fuselage. The extender therefore functions to support the bulk of the aircraft body, allowing the user to lift and maneuver the aircraft as desired, such as during transport (e.g., into and out of a vehicle).

Figure 5A:
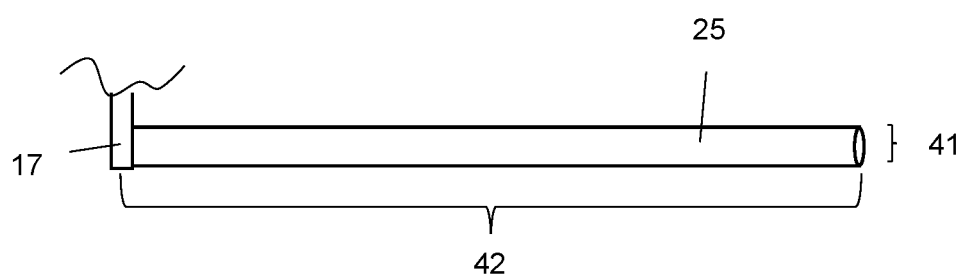
FIG. 5a is a front plan view of a device extender in accordance with some embodiments of the presently disclosed subject matter.

FIG. 5a illustrates one embodiment of extender 25. It should be appreciated that extender 25 can have a cross-sectional shape that allows mating with the interior of aircraft pin opening 80. For example, the extender can have a round cross-sectional shape, as shown. However, the presently disclosed subject matter is not limited and the extender can have any desired cross-sectional shape, so long as it allows the extender to pass through a corresponding pin opening. To this end, the diameter of the extender is less than the diameter of the corresponding pin opening to allow the extender to be positioned therein. For example, extender diameter 41 can be about 1, 2, 3, 4, 5, 6, 7, 8, 9, 10, 15, 20, 25, or 30 percent less than the diameter of a corresponding aircraft pin opening.

Extender 25 can have any desired length 42, so long as it is long enough to pass into the interior of the aircraft body and allow the user to lift the aircraft. In some embodiments, the extender can have a length of about 5-30 inches (e.g., about 5, 6, 7, 8, 9, 10, 11, 12, 13, 14, 15, 16, 17, 18, 19, 20, 21, 22, 23, 24, 25, 26, 27, 28, 29, or 30 inches). However, extender length 42 can be greater or less than the range set forth herein.

In some embodiments, the extender is constructed with a length to pass at least about 30% into the body interior, via pin opening 80. For example, the extender can pass through at least about 20, 25, 30, 35, 40, 45, 50, 55, 60, 65, 70, 75, 80, 85, 90, 95, or about 100% through the center of the fuselage via the pin openings.

Figure 5B:
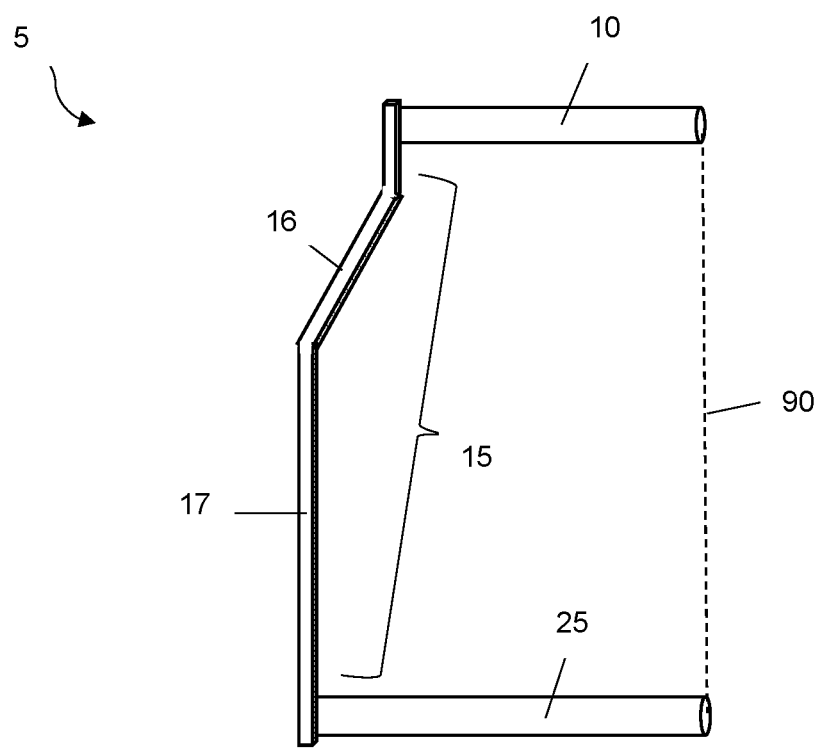
FIG. 5b-5d are front plan views of the disclosed lifting device in accordance with some embodiments of the presently disclosed subject matter.
Figure 5C:
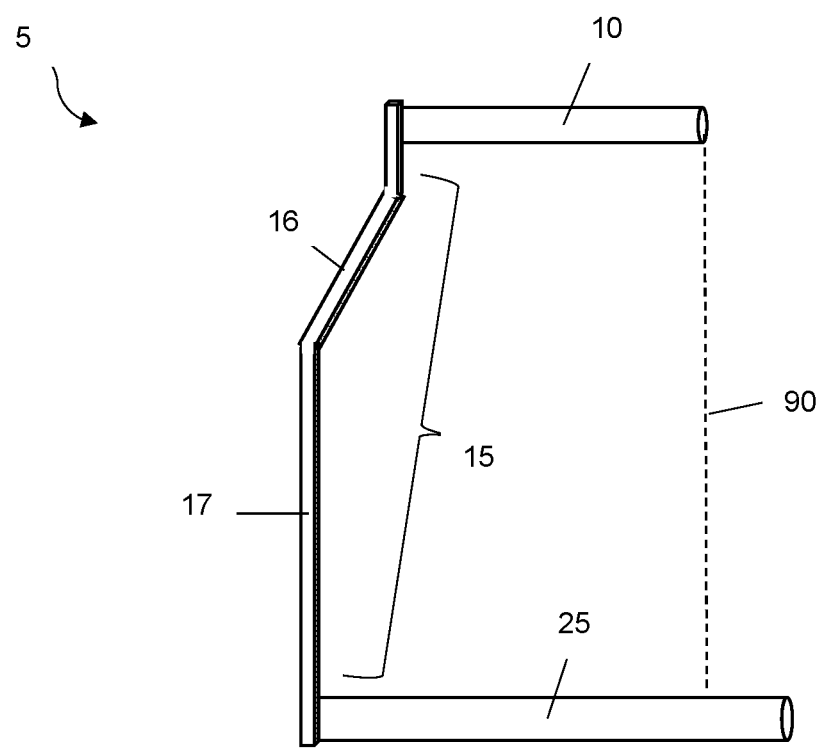
Figure 5D:
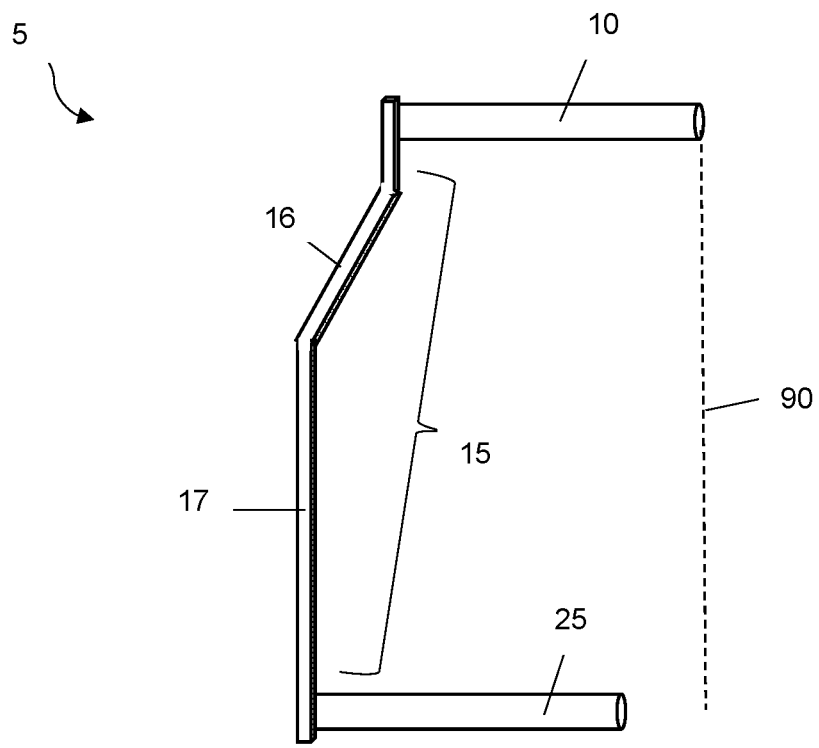

In some embodiments, the second ends of the handle and the extender can be aligned, as shown by line 90 in FIG. 5b. However, the device is not limited and includes embodiments wherein extender 20 extends further or less far compared than handle 10, as shown in the embodiments of FIGS. 5c and 5d, respectively. For example, the extender can be configured to be about 1-95% larger or smaller in length compared to the length of the handle (e.g., about 1, 2, 3, 4, 5, 10, 15, 20, 25, 30, 35, 40, 45, 50, 55, 60, 65, 70, 75, 80, 85, 90, or 95%). Further, in some embodiments, the handle and extender can be about parallel in configuration.

Figure 5E:
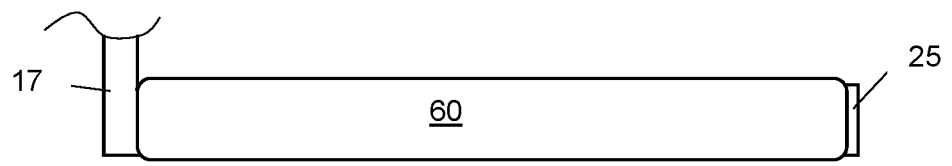
FIG. 5e is a front plan view of a device extender in accordance with some embodiments of the presently disclosed subject matter.

As shown in FIG. 5e, extender 25 can optionally include covering 60 that protects the interior of the aircraft body (e.g., pin openings) from damage due to rubbing or contact with the extender. In addition, covering 60 provides a non-skid surface to the extender, ensuring that the aircraft remains positioned on the extender and does not slide off during use. Covering 60 can comprise any suitable material, such as (but not limited to) silicon, rubber, polymeric material, foam, fabric, and the like.

Covering 60 can have any desired thickness, such as about 0.01, 0.02, 0.03, 0.04, 0.05, 0.1, 0.2, 0.3, 0.4, 0.5, 0.6, 0.7, 0.8, 0.9, or 1 inch. It should be appreciated that the combined thickness of the covering and the extender should be less than the diameter of the pin openings to allow for insertion therein. In some embodiments, the covering extends about the full length of the extender. However, the presently disclosed subject matter also includes embodiments wherein the covering spans at least about 50, 55, 60, 65, 70, 75, 80, 85, 90, or 95 percent of the length of the extender.

Device 5 can be constructed from any rigid material. The term "rigid" refers to a material capable of holding or retaining its original shape upon the application of weight and/or pressure. The materials used to construct handle 10, arm 15, and extender 20 can have a high stiffness or modulus of elasticity (e.g., $0.5 \times 10^6$ or greater). Suitable rigid materials can include (but are not limited to) metallic materials, polymeric materials, ceramic materials, wood, or combinations thereof. Suitable metallic materials can include one or more of aluminum, stainless steel, copper, nickel, iron, titanium, alloys thereof, and the like. Suitable polymeric materials can include one or more of polyethylene, polypropylene, and combinations thereof.

The disclosed device can be constructed as a single piece of material (e.g., the handle, angled portion, connector portion, and extender constructed from a single piece of material). Alternatively, one or more components of the device can be prepared and joined to one or more other components using methods well known in the art. For example, one or more of adhesives, welding, or mechanical closures (e.g., nuts, bolts, clips, snap-fit arrangements) can be used.

Figure 6:
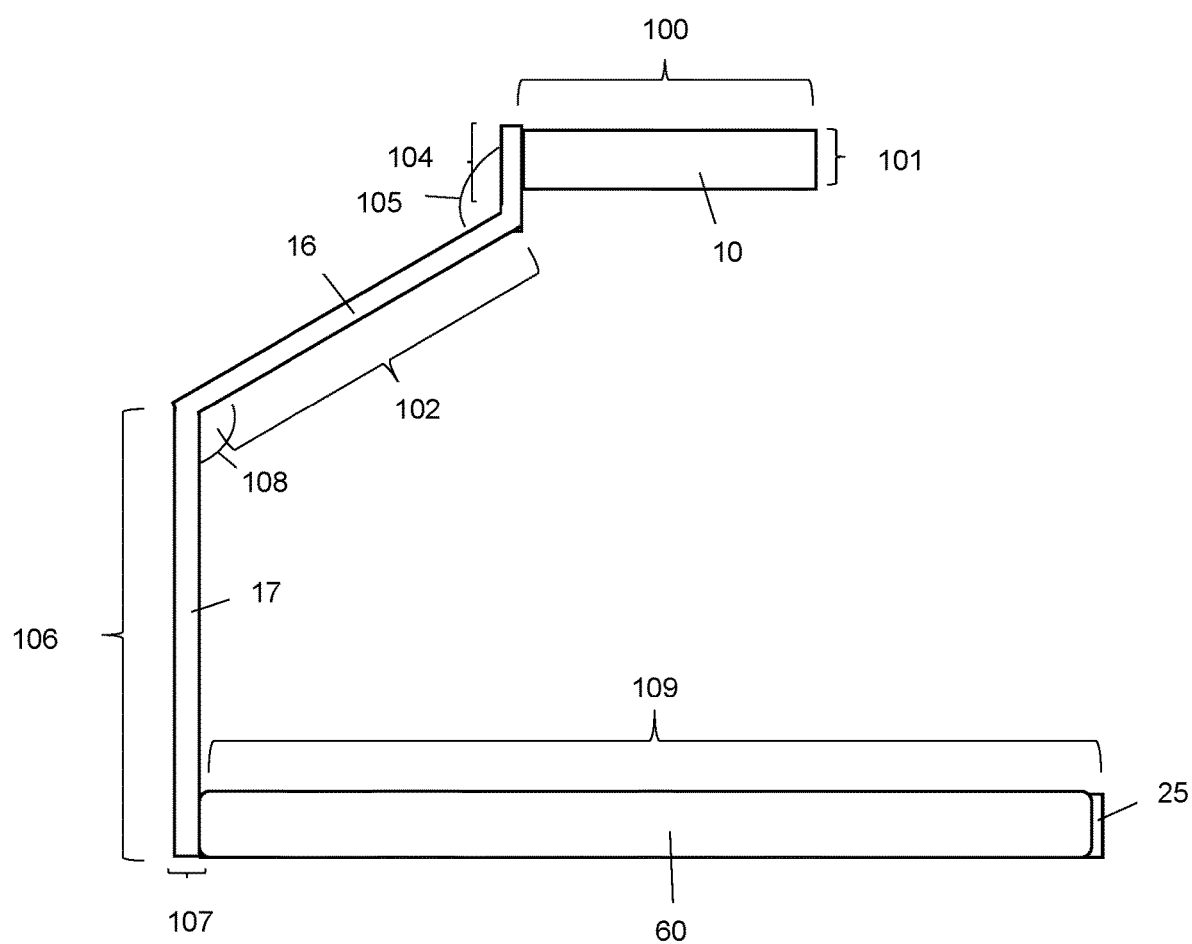
FIG. 6 is a front plan view of the disclosed lifting device in accordance with some embodiments of the presently disclosed subject matter.

The disclosed device can be configured with any desired dimensions, dependent upon the make and/or model of the particular aircraft the device is used with. FIG. 6 illustrates one non-limiting example of device 5. As shown, handle 10 can have length 100 of about 3-10 inches, such as (but not limited to) about 3, 3.5, 4, 4.5, 5, 5.5, 6, 6.5, 7, 7.5, 8, 8.5, 9, 9.5, or 10 inches. In some embodiments, the handle can have diameter 101 of about 0.5-2 inches, such as (but not limited to) about 0.5, 0.6, 0.7, 0.8, 0.9, 1, 1.1, 1.2, 1.3, 1.4, 1.5, 1.6, 1.7, 1.8, 1.9, or 2 inches. Angled portion 16 of the arm can have length 102 of about 3-8 inches (such as about 3, 3.5, 4, 4.5, 5, 5.5, 6, 6.5, 7, 7.5, or 8 inches) and a diameter of about 0.5-2 inches (such as about 0.5, 0.6, 0.7, 0.8, 0.9, 1, 1.1, 1.2, 1.3, 1.4, 1.5, 1.6, 1.7, 1.8, 1.9, or 2 inches). In some embodiments, neck 12 can have a length 104 of about 0.5-4 inches (e.g., about 0.5, 1, 1.5, 2, 2.5, 3, 3.5, or 4 inches). Angle 105 between handle 10 and angled portion 16 can be about 30-60 degrees, such as about 30, 35, 40, 45, 50, 55, or 60 degrees.

Connector portion 17 can have length 106 of about 5-10 inches, such as about 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, or 10 inches. The connector portion can have diameter 107 of about 0.25 to about 2 inches, such as about 0.25, 0.5, 0.75, 1, 1.25, 1.5, 1.75, or 2 inches. The connector portion can join with the angled portion at angle 108 of about 30-60 degrees (e.g., 30, 35, 40, 45, 50, 55, or 60 degrees). Extender 20 can have length 109 of about 8-20 inches (e.g., 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 inches) and a diameter of about 0.25 to 2 inches (e.g., 0.25, 0.5, 0.75, 1, 1.25, 1.5, 1.75, or 2 inches). In some embodiments, covering 60 can have a diameter about the same as the diameter of extender 20. It should be appreciated that the device is not limited and the various components can have lengths, diameters, and/or angles that are greater or lesser than the ranges set forth herein.

Figure 7A:
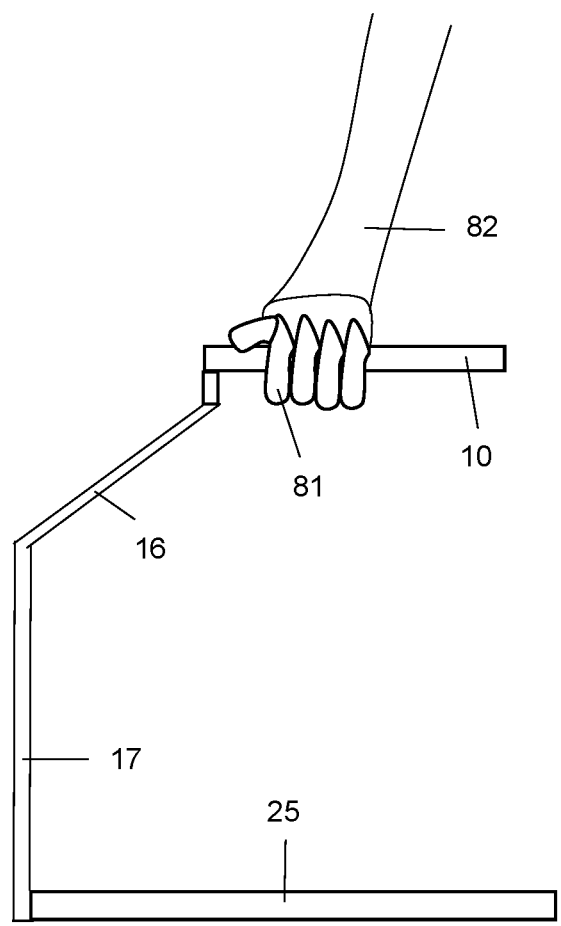
FIGS. 7a-7c are front plan views of the lifting device in use with an RC aircraft, in accordance with some embodiments of the presently disclosed subject matter.

Device 5 enables a user to lift and reposition an aircraft (e.g., an RC airplane) from a first location to a second location as desired. Particularly, as shown in the embodiment of FIG. 4, an aircraft is configured in a "travel position", with wings 70 removed and one or more pin openings 80 exposed. As illustrated in FIG. 7a, the user grasps device 5 at handle 10 for the combined purpose of directing the movement of the device and retention of the handle against axial slippage from the user's hand. Normally, the user's grip is maintained by squeezing the handle (e.g., grip 30) against the palm with fingers 81 of the hand that are wrapped around the handle. The user's arm 82 is typically positioned above the device, as shown, to allow the user to easily lift the device during use.

Figure 7B:
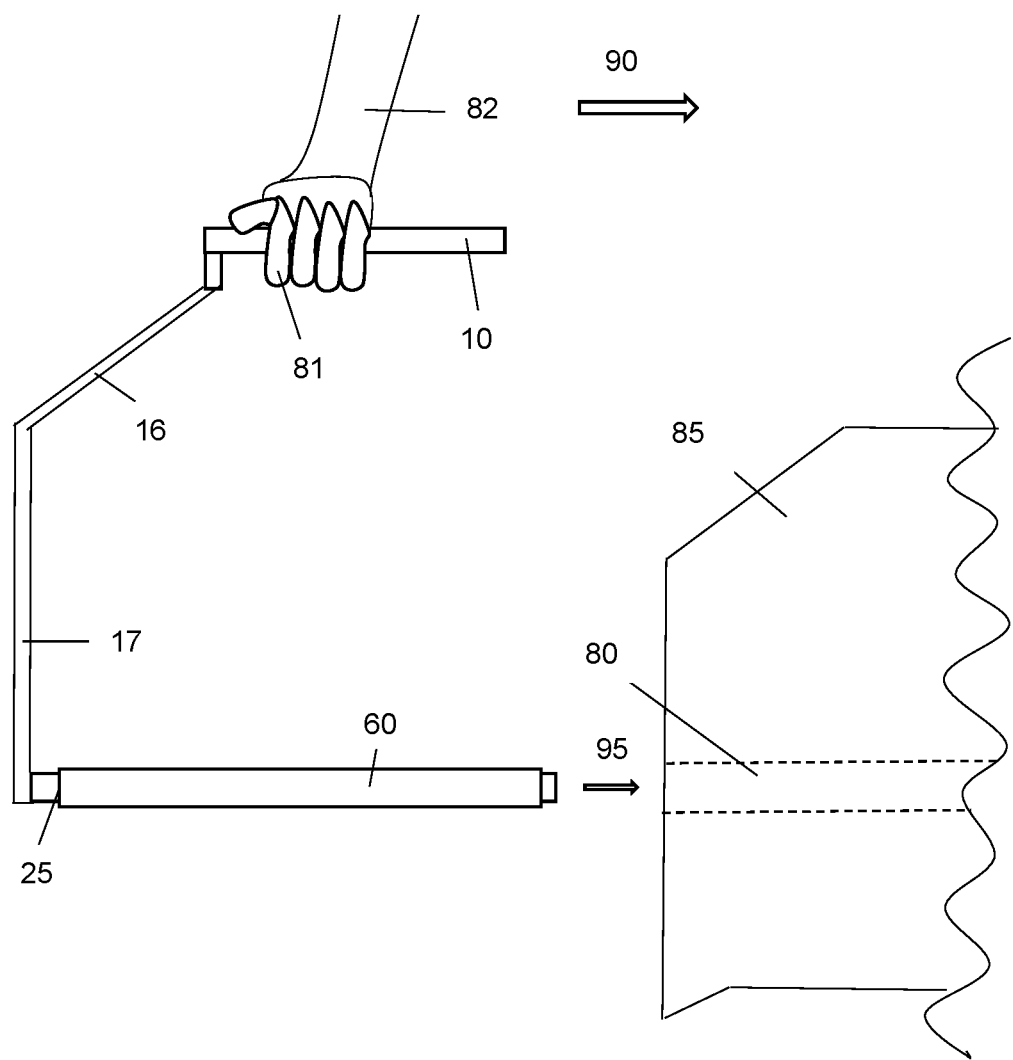
Figure 7C:
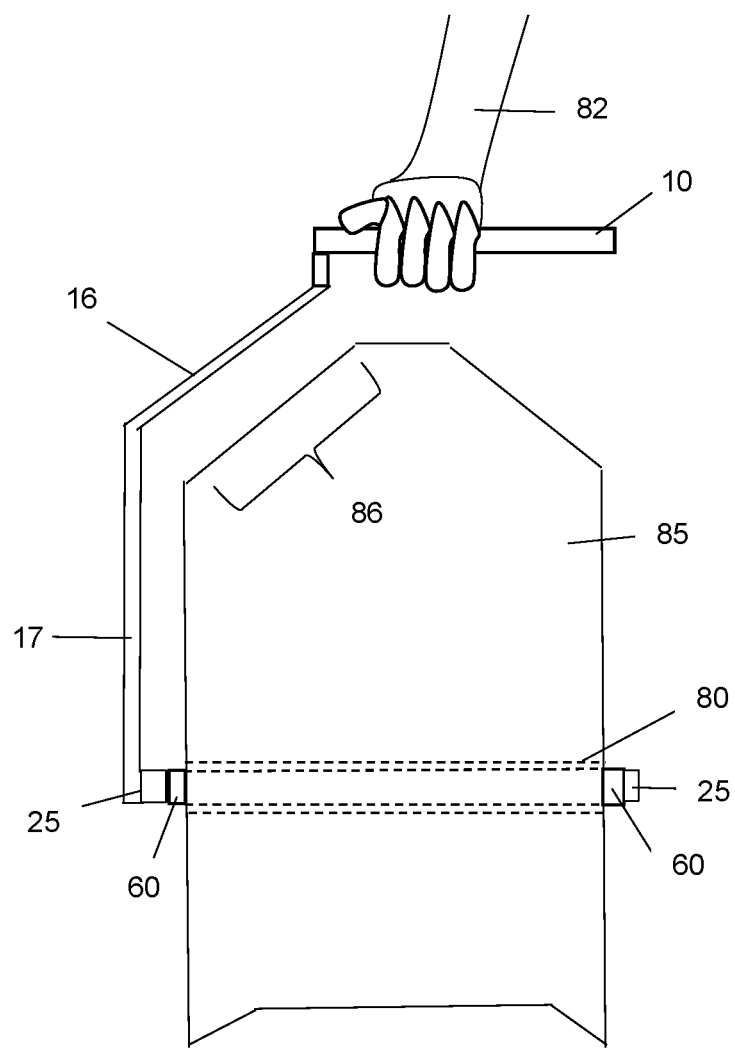
Figure 7D:
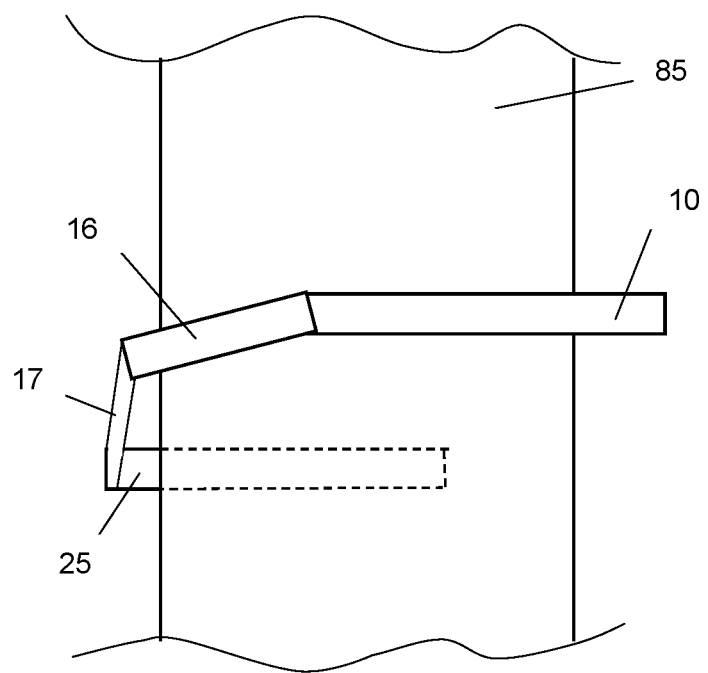
FIG. 7d is a perspective view of the lifting device in use with an RC aircraft in accordance with some embodiments of the presently disclosed subject matter.

As illustrated by arrows 90, 95 in FIG. 7b, the user maneuvers device 5 such that at least a portion of extender 25 is inserted into pin opening 80 of aircraft body 85. Particularly, the extender is received through the elongated pin opening, and the extender is effectively housed within the interior of the aircraft body, as shown in FIGS. 7c-7d. In some embodiments, the extender passes through the entire length of pin opening 80. Alternatively, the extender can be configured to pass through about 40-99 percent of the length of the pin opening (e.g., 40, 45, 50, 55, 60, 65, 70, 75, 80, 85, 90, 95, or 99 percent). When assembled, angled portion 16 of the device arm is angled to mimic the angle of aircraft canopy 86 of body 85, as shown. The user can then easily lift the hull of the aircraft to a desired location (e.g., during travel, assembly, and the like) by lifting the handle.

After the aircraft has been moved or positioned as desired, the user can remove the disclosed device. To remove device 5 from the aircraft, the user simply grasps handle 10 and maneuvers the device away from the aircraft, such that extender 10 exits pin opening 80. The wings can then be attached as would be known in the art.

Advantageously, the disclosed device provides a low-cost way to transport a large aircraft (e.g., RC aircraft), without requiring bulky padding or other materials that require a great deal of storage space.

Further, the disclosed device is easy to use, requiring little to no training of the user. The device is therefore simple to use and is effective for transporting the aircraft while minimizing damage to the aircraft.

What is claimed is:

1. A device comprising:
   a handle comprising a first end and a second end;
   an arm comprising an angled portion joined to a connecting portion, wherein the angled and connecting portions are each defined by a first end, second end, and main body therebetween; wherein the first end of the angled portion is coupled to the first or second end of the handle at an angle of about 95-175 degrees, and the second end of the angled portion is operably attached to the first end of the connecting portion at an angle of about 95-175 degrees;
   an extender with a first end that is joined to the second end of the connecting portion at an angle of about 45-135 degrees.

2. The device of claim 1, wherein the handle includes a gripping area configured around at least a portion of the handle.

3. The device of claim 1, wherein one or both of the angled portion or connector portion has an L-shaped, oval, or circular cross-sectional shape.

4. The device of claim 1, wherein the handle and the extender are configured to be about parallel relative to each other.

5. The device of claim 1, wherein the extender and the connecting portion are configured to be about perpendicular to each other.

6. The device of claim 1, wherein the extender includes a covering that extends around at least a portion of an external surface of the extender.

7. The device of claim 6, wherein the covering comprises silicon, rubber, polymeric material, foam, fabric, or combinations thereof.

8. A device comprising:
   a handle comprising a first end and a second end;
   an arm comprising an angled portion joined to a connecting portion, wherein the angled and connecting portions are each defined by a first end, second end, and main body therebetween;
   a neck comprising a first end and a second end, wherein the first end is operably connected to the first end of the handle and the second end of the neck is joined to the first end of the angled portion;
   wherein the second end of the angled portion is operably attached to the first end of the connecting portion at an angle of about 95-175 degrees; and
   an extender with a first end that is joined to the second end of the connecting portion at an angle of about 45-135 degrees.

9. The device of claim 8, wherein the handle includes a gripping area configured around at least a portion of the handle.

10. The device of claim 8, wherein one or both of the angled portion or connector portion has an L-shaped, oval, or circular cross-sectional shape.

11. The device of claim 8, wherein the handle and the extender are configured to be about parallel relative to each other.

12. The device of claim 8, wherein the extender and the connecting portion are configured to be about perpendicular to each other.

13. A method of lifting and relocating an aircraft with a body comprising at least one opening therethrough, the method comprising:
    grasping the handle of the device of claim 1;
    inserting the second end of the extender into the aircraft body opening, such that the extender spans at least a portion of an interior of the aircraft opening; and
    lifting the device by grasping the handle and lifting to thereby lift the body of the aircraft to a desired location.

14. The method of claim 13, wherein the handle includes a gripping surface configured around at least a portion of the handle.

15. The method of claim 13, wherein the angled portion is coupled to the handle via a neck.

16. The method of claim 13, wherein one or more of the handle or extender has a circular or L-shaped cross-sectional shape.

17. The method of claim 13, wherein the handle and the extender are configured to be about parallel relative to each other.

18. The method of claim 13, wherein the extender and the connecting portion are configured to be about perpendicular to each other.

19. The method of claim 13 wherein the extender includes a covering that extends around at least a portion of the extender.

20. The method of claim 19, wherein the covering is constructed from silicon, rubber, polymeric material, foam, fabric, or combinations thereof.

* * * * *